United States Patent Office 3,597,516
Patented Aug. 3, 1971

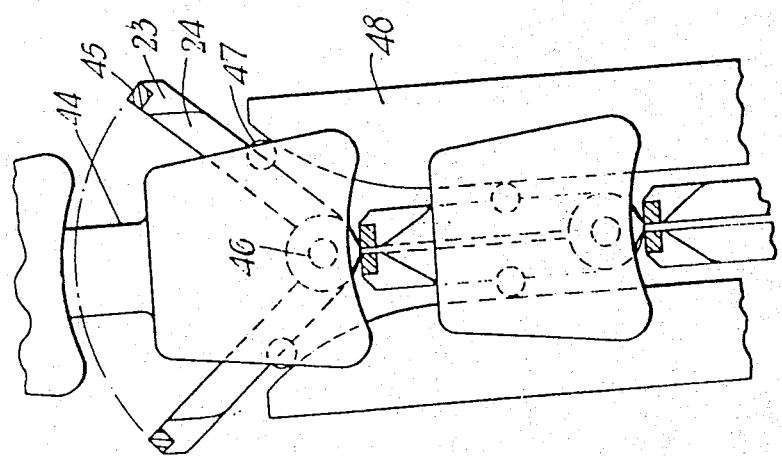
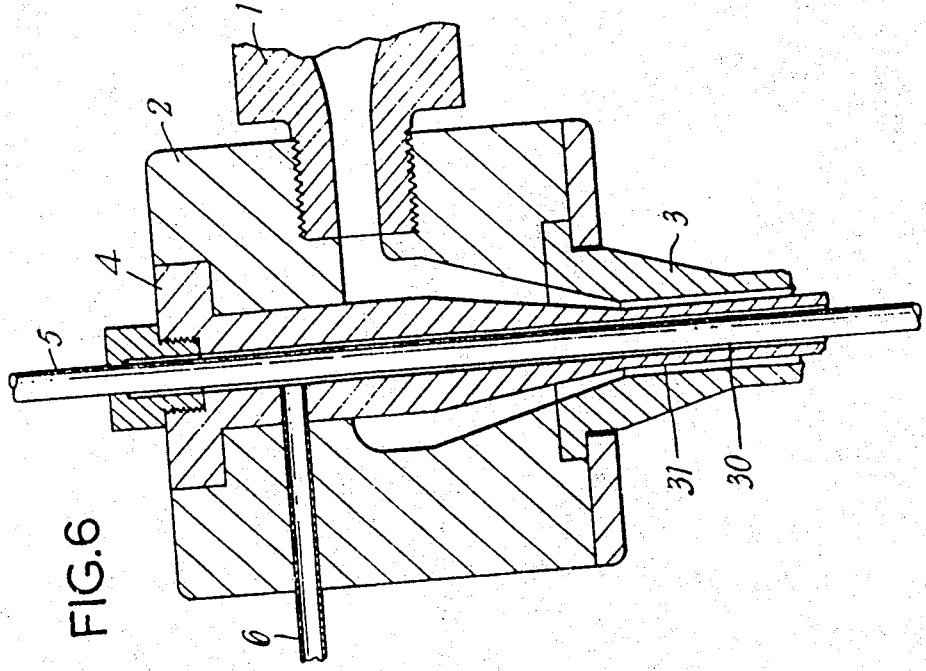

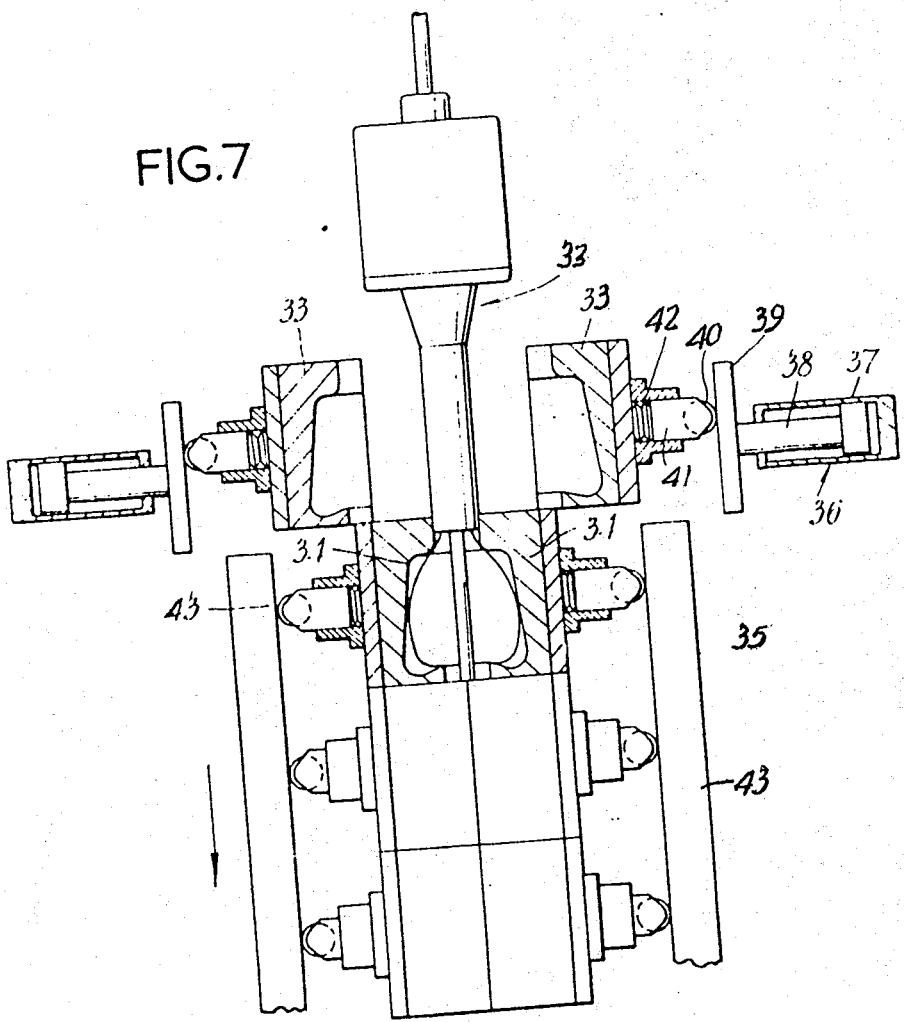

3,597,516
METHOD OF PRODUCING FILLED MOULDED CONTAINERS
Norman Frederick Harwood, Bognor Regis, Sussex, England, assignor to Regis Machinery (Sussex) Limited, Sussex, England
Filed Sept. 26, 1968, Ser. No. 762,679
Claims priority, application Great Britain, Sept. 27, 1967, 44,065/67
Int. Cl. B29c 17/07
U.S. Cl. 264—96
8 Claims

ABSTRACT OF THE DISCLOSURE

A method of, and apparatus for, producing filled moulded containers by blow-moulding a ribbon of open-ended containers joined end-to-end from a thermoplastics material, introducing a filling into the containers while they are still part of the ribbon and thereafter sealing the containers in their end regions.

This invention relates to a method of and apparatus for producing at least partially filled, blow-moulded containers, particularly but not necessarily under sterile conditions.

It is an object of the present invention to provide a method of and an apparatus for manufacturing, filling and sealing of containers at a high speed, for example 120 units per minute, from a thermoplastics material of, for example, the polyolefin type, such as high or low density polyethylene or polyproplene, under virtually sterile conditions. The containers will generally take the form of a bottle or sachet.

According to one aspect of the present invention, there is provided a method of producing at least partially filled moulded containers, which comprises blow-moulding a ribbon formed of a plurality of open-ended containers joined end-to-end from a thermoplastics material, introducing a filling medium into the containers whilst they are still part of the ribbon and thereafter sealing the containers in their end regions.

A sterile blowing agent and a sterile thermoplastics material are used if the containers are required to be sterile. The filling is also sterile if the contents of the containers are to be sterile. The at least partially filled containers may be separated at any time after the sealing thereof.

The invention also provides in accordance with another aspect thereof an apparatus suitable for the manufacture of at least partially filled moulded containers by the method described in the previous paragraph, which apparatus comprises a thermoplastics material extruder connectable to a die head, sizing die and mandrel, the mandrel being bored through to accept a tube through which the filling can be supplied, the clearance between the tube and the mandrel being sufficient to ensure a supply channel for a blowing agent, a blow-moulding assembly in which each mould is formed from at least two mould portions capable of being brought together to form the mould, and means for sealing the containers after they leave the blow-moulding assembly, the arrangement being such that the desired filled containers can be produce therewith. The apparatus may also be provided with means for separating the filled containers.

In the method of the present invention, it is preferred to use a moulding temperature of above 120° C., since the ribbon formed will then be sterile. It is preferred to use air as the blowing agent. The blowing agent used for the blow-moulding should be sterile but is only used in small amounts since there is normally no escape route in the system. The filling acts as a coolant for the containers and thereby the process is capable of achieving production speeds not possible if air cooling alone were used, for example a production speed of 120 containers per minute can be achieved.

In one embodiment of the invention, during the sealing of the containers, it is preferred that each container be squeezed in the middle (side wall) thereof so that the container reforms on the release of the squeezing to a shape which will cause the base seal thereof to invert either automatically on severing or when pushed in at the base. Alternatively, the containers could be moulded with the bases thereof directed inwardly and stretched before sealing to pull the bases out, so that after sealing the bases will retract due to normal stress recovery. The containers may be separated by, for example, mechanical cutting or pulling at a suitable station.

For a better understanding of the invention and to show how the same may be carried into effect, reference will now be made by way of example to the accompanying drawings, in which:

FIG. 6 is a cross-sectional view, on an enlarged scale, of the die head, sizing die and mandrel in the apparatus of FIG. 1 or 5;

FIG. 7 is a diagrammatic side view, partly in section, of part of the mouldng assembly of the apparatus of FIG. 5;

FIG. 8 is a diagrammatic side view, partly in section, of part of the heat sealing assembly of the apparatus of FIG. 5.

Figure 1:
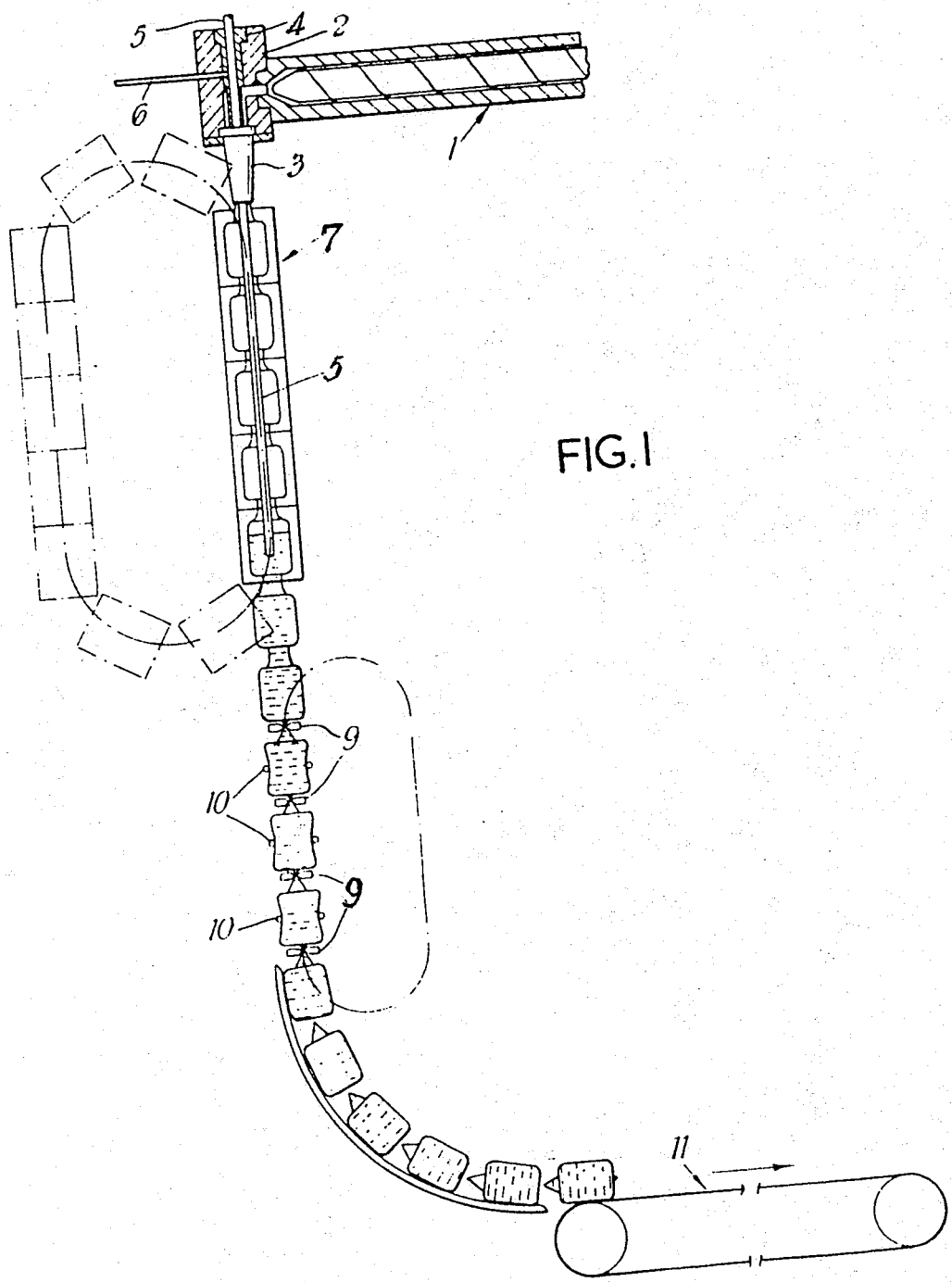
FIG. 1 shows a diagrammatic side view partly in section of an apparatus according to the present invention.

Reference now to FIG. 1 of the drawings, an extruder 1 having a 6 mm. capacity is a standard extruder unit (such as a 2½ inch Baker Perkins Extruder). The extruder is capable of providing an output of approximately 40 kilograms per hour at 75% working load. As there is no die control, the extruder 1 should not fluctuate in speed or temperature and accordingly a high quality machine is used. Precise speed control for the extruder should preferably be eddy-current coupling with feedback variation in the upper range. The extruder 1 is mounted on a slide rail (not shown) to provide a withdrawal movement of approximately one meter.

The extruder 1 feeds its melt to a vertically disposed die head 2 provided with a side feed. The die head 2 is heated in the upper zones thereof, and accommodates a sizing die 3 and a mandrel 4 which are not heat controlled and which must be preheated by an induction heater ring or the like (not shown) situated away from the machine (hence the requirement for the extruder 1 to be removable). The melt is fed out of an annular channel (31 in FIG. 6) between the mandrel 4 and the sizing die 3.

The mandrel 4 is bored to accept a tube 5 through which the filling for the containers is supplied and the clearance between the tube 5 and mandrel 4 is sufficient to ensure a supply channel (30 in FIG. 6) for blowing air fed from a compressor (not shown) via a steriliser (likewise not shown) through pipe 6. Filling fluid is fed to the supply tube 5 from a pump (not shown) which is capable of nonpulsating action, or gravity feed from a header tank could be used and the supply is valved so as to provide a restricted flow of non-foaming character.

The tube of thermoplastics material produced by the die assembly is introduced into a jaw action, blow-mould assembly indicated generally at 7 and the closure of jaws 8 (see FIG. 2) thereof must be gauged so as to allow the mould to contact the extended die form as it proceeds in a downward path and then shut.

Blowing takes place by the introduction of air through pipe 6 and the die head assembly, and fluid is supplied simultaneously through the tube 5. The level of the fluid within the shaped tube is maintained by a valve control (not shown) and is prevented from escaping because the sealing of the container takes place below the moulding areas. The fluid also acts as a lower shut-off for air flowing from above.

The formed and filled ribbon of containers now passes downwardly and is contacted by sealing jaws 9 and squeezing fingers 10 of a heat sealing assembly. The squeezing fingers 10 perform two functions; firstly they support the container during sealing and secondly they distort the shape thereof to cause the same to withdraw its base after sealing and separation (see FIGS. 3 and 4). The heat sealing assembly can either be jaw action or a double caterpillar and electrical supply will have to be provided to the heaters of the sealing fingers 10 by a slip ring assembly or the like (not shown). It appears from FIG. 1 that there are only two squeezing fingers 10 per container. In fact, of course it is perfectly possible to have more than two such fingers.

The containers are then delivered to a delivery and/or separation area indicated generally at 11 where the containers are either transported joined together or separated at any point along the line after the sealing and squeezing operations.

Figure 9:
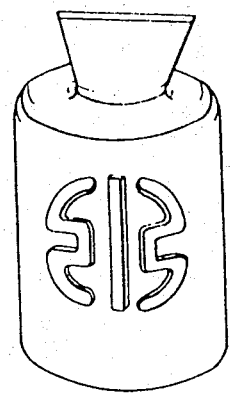
FIG. 9 is a side view of a container made by the method and apparatus of the present invention, showing distinctive markings on its side wall.

With suitable shaping of the moulds, it is possible to provide a machine which is capable of producing practically any shape of container or bottle and by introducing suitable markings into the mould it is possible to emboss heavily on the containers trade names, trademarks and the like, see FIG. 9. This is particularly advantageous when producing sachets or bottles containing pharmaceutical preparations, since identification of the contents can be marked on the container in a simple manner.

Figure 3:
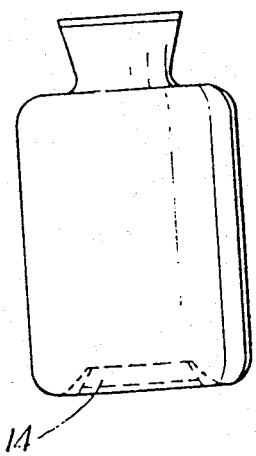
FIGS. 3 and 4 show containers made by the apparatus of FIG. 1.
Figure 4:
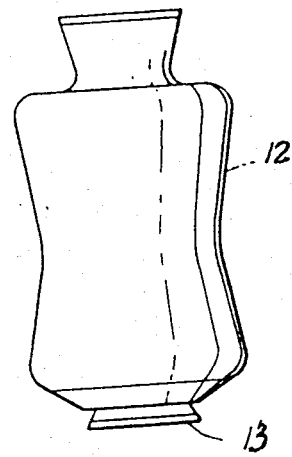

The container shown in FIG. 4 has a squeezed side wall 12 and a pinched-together outwardly-protruding base portion 13. When the side wall 12 is released the base portion takes the form of a depression 14 as shown in FIG. 3.

Figure 2:
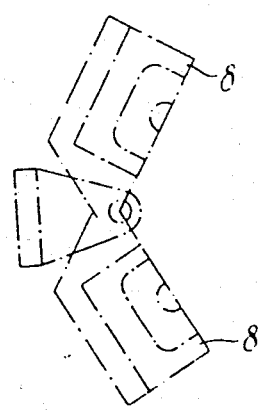
FIG. 2 shows diagrammatically a cross-section through a "caterpillar" (or "jaw-action") mould suitable for use in the apparatus of FIG. 1.

The "jaw-action" mould shown in FIG. 2 could be replaced by a mould having more than two mould portions.

It will of course be appreciated that the heat sealing and side squeezing mechanism must operate at the same rate as the blow-moulding assembly. In addition, the heat sealing fingers 9 and the squeezing fingers 10 must be "pitched" correctly so that only the appropriate parts of the containers are contacted by these means. It will also be appreciated that when the extent to which the squeezing fingers 10 squeeze the side wall of the containers is variable, the volume of the contents sealed in the containers can be varied accordingly.

Figure 5:
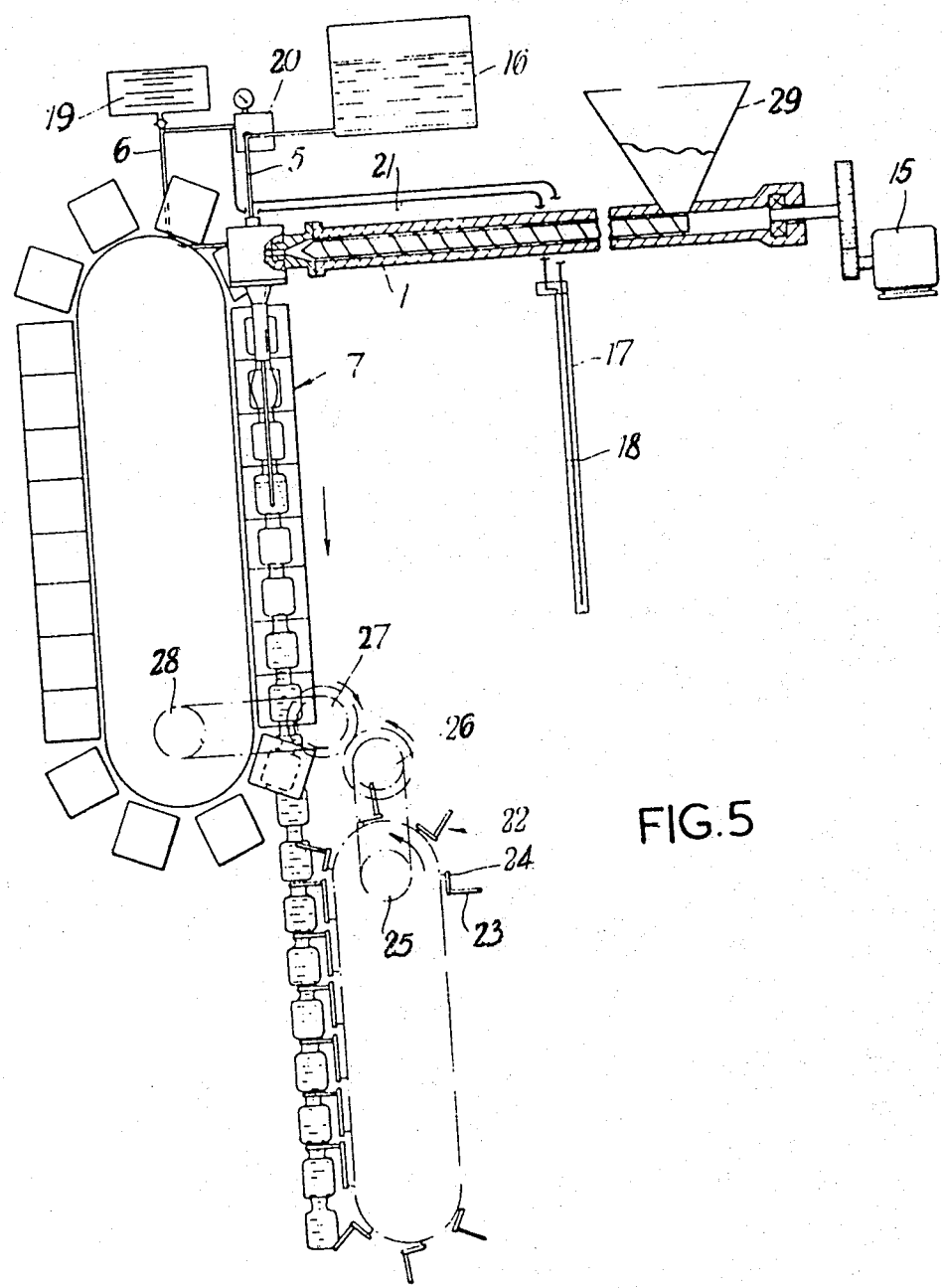
FIG. 5 shows a diagrammatic side view partly in section of another apparatus according to the invention.

Referring now to FIG. 5 of the accompanying drawings, those parts of the apparatus which are the same as or similar to the corresponding parts in the apparatus of FIG. 1 are indicated by the same reference numeral.

The filling medium which is supplied through the tube 5 is contained in a storage tank 16 and is either gravity fed or under pressure. The level of the filling medium in the blow-moulding assembly is indicated on a level gauge 17 at the point 18. The gauge 17 is connected to the tube 5 and the space above the filling medium in the level gauge 17 is connected by a pipe 21 to the pipe 6 through which air, which may be sterilised, or an inert gas is led from a supply 19 to the channel 30. An automatic pressure switch 20 adusts the flow of filling medium through the pipe 5 depending on the rise or fall of the pressure of the blowing medium in the pipe 21, although of course manual adjustment is possible, particularly if a pressure gauge is provided for indicating the pressure of the blowing medium.

The extruder screw is powered by an electric motor 15 via an appropriate gearing arrangement and the thermoplastics material is fed to the extruder through a hopper 29.

The heat sealing and cutting assembly has a plurality of pairs 22 of blades, each blade being formed from a cutting and heating portion 23 which is rigidly attached to one end of a spacing portion 24 which is attached as its other end to a pivoting means (not shown) on which is also attached the spacing portion of the other blade. This is shown in more detail in FIG. 8 where the heating and cutting portion 23 is shown end-on and is provided with a heating element 45 in its terminal region. The spacing portions are pivoted on a pivot 46 and provided with a roller 47 which, during the heating and cutting part of the cycle, engages with a guide means 48 thereby causing the blades to close on the upper part of a neck 44 between two at least partially filled containers.

The upper part of the blow-moulding assembly of the apparatus of FIG. 5 is shown in detail in FIG. 7. The mandrel, die head and sizing die assembly is generally indicated at 32. Level with the lower end of the assembly 32 is a pair of half moulds 33 shown in the open position. In order to bring the half moulds into the closed position, as shown by mould portions 34 in which a partially formed container 35 is being expanded, a hydraulically or pneumatically operated expansion means 36 is operated. The means 36 consists of a cylinder 37 in which is a displaceable piston 38 attached to one end of which is a beam 39 against which presses a wheel 40 attached to one end of a piston 41, the other end of which presses via a dished washer spring 42 onto the half mould 33. When the half mould is pressed fully inwards, i.e. when it meets its other half, the wheel 40 is in a position in which it can continue the next part of its downward journey inside the guide means 43.

Obviously it is necessary for the heat sealing operation to be carried out on the same number of containers per unit time as the moulding operation. This is achieved in the apparatus of FIG. 5 by causing a drum 25 which drives the heat sealing assembly to drive via a pulley a drum 26 which drives a drum 27 which in turn drives, via a pulley, a drum 28 which drives the blow-moulding assembly.

It will be appreciated that in each of FIGS. 1 and 5, only one of the two mould portions is shown for those moulds in which the blow-moulding and/or filling operations are being carried out.

Although the dies shown in FIGS. 1, 5, 6 and 7 have a circular cross-section, it would of course be possible to provide dies with any other suitable cross-section, for example one with an oblong rectangular cross-section, which causes containers having an oblong cross-section neck to be produced; such containers are easily cut by applying the heating and cutting blades to the longer edges of the oblong.

What I claim is:

1. Method of continuously producing under sterile conditions at least partially filled moulded containers, which comprises extruding a thermoplastics material through a die head provided with a sizing die and mandrel; blow-moulding the extruded sterile thermoplastics material so as to form a plurality of open-ended containers joined end-to-end by maintaining in the extruded material a gaseous sterile medium which is in communication via a passageway in said mandrel with a pressure-maintaining means; introducing a sterile filling medium into the containers through a tube passing through said mandrel while the containers are still open-ended and joined end-to-end, said tube extending below the surface of the filling medium already present in at least one of those containers still open-ended and joined end-to-end, and said gaseous sterile medium being trapped above the surface of the filling medium; and thereafter sealing the filled containers at their end regions, wherein, during the sealing of the end regions of the containers, each container is squeezed in the side wall region thereof so that, upon or after release of the squeezing, the container will reform to a shape in which the sealed end forming the base of the container is inverted.

2. Method according to claim 1, wherein the containers are separated after sealing.

3. Method of continuously producing under sterile conditions at least partially filled moulded containers, which comprises extruding a thermoplastics material through a diehead provided with a sizing die and mandrel; blow-moulding the extruded sterile thermoplastics material so as to form a plurality of open-ended containers joined end-to-end by maintaining in the extruded material a gaseous sterile medium which is in communication via a passageway in said mandrel with a pressure-maintaining means; introducing a sterile filling medium into the containers through a tube passing through said mandrel while the containers are still open-ended and joined end-to-end, said tube extending below the surface of the filling medium already present in at least one of those containers still open-ended and joined end-to-end, and said gaseous sterile medium being trapped above the surface of the filling medium; and thereafter sealing the filled containers at their end regions, wherein the containers are moulded with the end which is to form the base of the container thereof directed outwardly and stretched, before sealing, to pull the base portions out, so that, after sealing and upon release from stretching, the base portions will retract due to normal stress recovery.

4. Method according to claim 3, wherein the containers are separated after sealing.

5. Apparatus suitable for the continuous manufacture, under sterile conditions, of at least partially filled moulded containers, which apparatus comprises a thermoplastic material extruder connectable to a die head having a sizing die and mandrel, the mandrel being bored through to accept a tube through which a sterile filling medium can be supplied, the clearance between the tube and the mandrel being sufficient to ensure a supply channel for a sterile gaseous medium, a blow-moulding assembly capable of forming a plurality of open-ended containers joined end-to-end, in which assembly each mould is formed from at least two mould portions capable of being brought together to form the mould, means for controlling, during the operation of the apparatus, the introduction of the filling medium into said plurality of open-ended containers so as to ensure that the surface of the filling medium already present in at least one of said plurality of open-ended containers is maintained above the bottom end of the tube, means for sealing the containers after they leave the blow-moulding assembly, and means in communication with said supply channel for maintaining under pressure the sterile gaseous medium trapped in said plurality of open-ended containers above the surface of the filling medium, wherein the means for sealing the containers comprises a means for squeezing the side wall portions of the containers and means for sealing the end regions between adjacent containers.

6. Apparatus as claimed in claim 5, wherein the means for sealing the end regions is also capable of concomitantly cutting the end regions.

7. Apparatus suitable for the continuous manufacture, under sterile conditions, of at least partially filled moulded containers, which apparatus comprises a thermoplastic material extruder connectable to a die head having a sizing die and mandrel, the mandrel being bored through to accept a tube through which a sterile filling medium can be supplied, the clearance between the tube and the mandrel being sufficient to ensure a supply channel for a sterile gaseous medium, a blow-moulding assembly capable of forming a plurality of open-ended containers joined end-to-end, in which assembly each mould is formed from at least two mould portions capable of being brought together to form the mould, means for controlling, during the operation of the apparatus, the introduction of the filling medium into said plurality of open-ended containers so as to ensure that the surface of the filling medium already present in at least one of said plurality of open-ended containers is maintained above the bottom end of the tube, means for sealing the containers after they leave the blow-moulding assembly, and means in communication with said supply channel for maintaining under pressure the sterile gaseous medium trapped in said plurality of open-ended containers above the surface of the filling medium, wherein the means for sealing the containers comprises means for stretching the end regions between adjacent containers and means for sealing the said end regions.

8. Apparatus as claimed in claim 7, wherein the means for sealing the said end region is also capable of concomitantly cutting the end region.

References Cited

UNITED STATES PATENTS

| | | | |
|---|---|---|---|
| 3,331,902 | 7/1967 | Stark | 18—5X |
| 3,035,302 | 5/1962 | Lysobey | 264—99X |
| 3,275,728 | 9/1966 | Martino | 264—99X |
| 3,305,891 | 2/1967 | Nozaki | 264—99X |
| 3,328,837 | 7/1967 | Moran | 264—99X |
| 3,357,046 | 12/1967 | Pechthold | 264—99X |
| 3,380,121 | 4/1968 | Chittenden et al. | 18—5BL |
| 3,399,508 | 9/1968 | Frielingsdorf et al. | 264—99X |

FOREIGN PATENTS

| | | | |
|---|---|---|---|
| 1,180,301 | 10/1964 | Germany | 264—98 |
| 1,352,437 | 1/1964 | France | 264—96 |
| 6617080 | 6/1967 | Netherlands | 264—99 |

ROBERT F. WHITE, Primary Examiner

T. J. CARVIS, Assistant Examiner

U.S. Cl. X.R.

18—5; 53—140; 264—99